Dec. 22, 1931.  A. GHISOLFO  1,837,426
DRAFT COUPLING FOR AGRICULTURAL IMPLEMENTS
Filed June 24, 1929
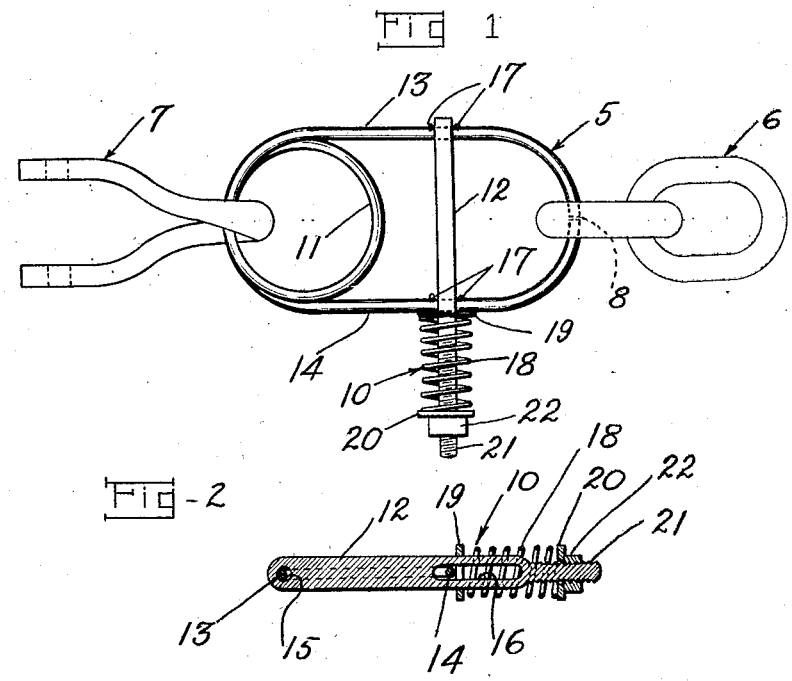
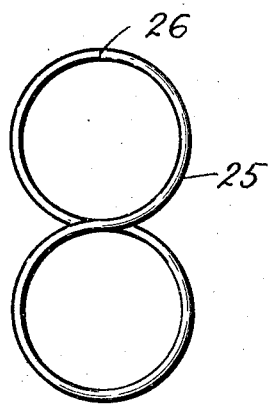
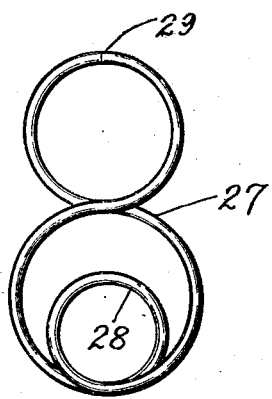
INVENTOR.
AUGUST GHISOLFO
BY Joseph B. Gardner
HIS ATTORNEY.

Patented Dec. 22, 1931

1,837,426

UNITED STATES PATENT OFFICE

AUGUST GHISOLFO, OF CALISTOGA, CALIFORNIA

DRAFT COUPLING FOR AGRICULTURAL IMPLEMENTS

Application filed June 24, 1929. Serial No. 373,250.

This invention relates to an improved draft coupling and more particularly to an automatically releasing coupling means for connecting an agricultural or other ground working implement with a draft vehicle therefor.

An object of the invention is to provide a simple and convenient coupling link which will automatically open and disconnect the implement from the draft vehicle incident to the implement encountering a root, boulder or other unyielding obstruction, without breaking or deranging the link whereby the link may be used time and again for its coupling purposes.

Another object is to provide an operable coupling link of the character described, which link will resiliently resist the opening thereof under normal draft loads, but will open under abnormal loads as above described and after thus opening will automatically close and be subject to further use.

A further object is to provide a coupling link of the character described which is adjustable to regulate the resistance to the opening thereof whereby the link may be set to open under varying draft loads to best suit the conditions at hand.

A still further object is to provide a draft coupling means of the character described which is small, compact, strong, comparatively inexpensive and capable of use over long periods of time.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings,

Figure 1 is a top plan view of the coupling means of this invention as when connected with the implement and draft vehicle coupling elements.

Figure 2 is a sectional view taken on the plane of line 2—2 of Figure 1.

Figure 3 is a top plan view of a modified form of the coupling of this invention.

Figure 4 is a top plan view of another modified form of the coupling of the invention.

One embodiment of the invention as disclosed in detail in the accompanying drawings comprises a metal coupling link 5 which is employed to connect an agricultural or other ground working implement carried coupling element 6 with a draft vehicle carried draft element 7. This link is constructed and arranged so that it will open and release the implement from the traction vehicle when the former encounters a heavy or unyielding obstruction, whereby injury to the implement or draft vehicle or dislodgment of the obstruction are prevented. In the present instance this release of the implement is automatic, does not damage or derange the link and therefore permits of further use of the link for its automatic releasing coupling purposes.

As here shown the link is split or divided as at 8 whereby, as before explained, it will open under heavy and suddenly imposed draft loads. Preferably the link is constructed and arranged to resiliently resist its opening whereby after opening it will return to its normal closed position and will be ready for further use.

The link may be inherently resilient to provide for this resilient resistance to its opening, or, if the link is made of non-resilient material, a spring device may be employed to provide for said resilient resistance. In the present embodiment as shown in Figures 1 and 2 the link is made of resilient wire and may also have a spring device 10 associated therewith to increase the said resilient resistance and to provide for regulating or controlling the automatic releasing or link opening operation.

As shown in Figures 1 and 2 the link is convolved as at 11 to strengthen it and provide an increased spring action at the split 8. The spring means 10 comprises a bar 12 secured at one end to the side 13 of the link and slidably engaged between its ends with the other side 14 of the link. The side 13 is extended through an opening 15 in said bar to thereby secure the bar in place whereas a slot 16 in the bar slidably receives the side 14 and thereby slidably joins the link with said bar. Projections 17 are formed on the sides 13 and 14 to prevent displacement of the bar lengthwise of the link.

A helical expansion spring 18 is mounted on the bar and engages a washer 19 disposed against the side 14 of the link. A similar washer 20 is mounted on said bar and engages the outer end of the spring. This outer end of the bar is of cylindrical form and provided with screw threads 21 whereby a nut 22 may be adjusted on the bar to vary the tension of the spring 18. By varying this tension the resistance to the opening of the link may be varied as desired. By this spring arrangement the spring 18 tends to force the links ends at 8 together and to resist the spreading apart of said ends.

I may omit the spring device and rely on the inherent resiliency of the link as shown in Figures 3 and 4. In Figure 3 the link 25 is made of resilient wire bent into a figure 8 form and has its split or division at the point 26. In Figure 4 the link 27 is made of resilient wire and bent into figure 8 form with an additional convolution 28 corresponding to the convolution 11 shown in Figures 1 and 2. This form has its split at 29. The links shown in Figures 3 and 4 will resiliently resist opening and automatically close after opening by reason of the resiliency of the links.

It will now be apparent that the coupling device of my invention will constitute a marked improvement over the breakable pin coupling such as heretofore used to connect an agricultural or other ground working implement with a draft vehicle therefor. With my coupling a quick and effective coupling of the implement is provided for as well as a positive uncoupling thereof incident to a heavy or suddenly imposed draft load thereon, and without destruction of or in any way impairing the link, which may be used time and again. Another feature of advantage is that the spring resistance to the opening of the link may be increased or decreased as desired by use of the adjustable spring device 10. In this way the coupling may be set to open on heavy or light draft load strains, as desired to suit the working conditions at hand.

I claim:

1. In a draft coupling for connecting an agricultural or other ground working implement with a draft vehicle therefor, an openable divided coupling link made of a resilient piece of resilient wire bent to form a closed loop at one end and an openable loop at the other end of the link which latter resiliently resists the opening thereof, said closed loop lying within the confines of other loop.

2. In a draft coupling for detachably connecting an agricultural or other ground working implement with a draft vehicle, a single piece of resilient wire bent to form a link with the ends of the wire disposed in close relation at one end of the link and subject to yieldingly spreading apart incident to the imposition of a heavy draft load on said link, a bar extending across said link with one end secured to one side of the link, and a portion thereof slidably engaged with the other side of said link, a spring arranged on said bar to normally hold said link closed, and means for varying the tension of said spring.

In testimony whereof, I have hereunto set my hand at Napa, California, this 11th day of June, 1929.

AUGUST GHISOLFO.